United States Patent [19]

Ballnus

[11] Patent Number: 5,076,928
[45] Date of Patent: Dec. 31, 1991

[54] PROCESS FOR BIOLOGICAL WASTEWATER TREATMENT

[75] Inventor: Wilhelm Ballnus, Burgwedel, Fed. Rep. of Germany

[73] Assignee: Schreiber Corporation, Inc., Trussville, Ala.

[21] Appl. No.: 493,484

[22] Filed: Mar. 14, 1990

Related U.S. Application Data

[63] Continuation of Ser. No. 179,701, Apr. 11, 1988, abandoned.

[30] Foreign Application Priority Data

Apr. 11, 1987 [DE] Fed. Rep. of Germany ....... 3712433

[51] Int. Cl.$^5$ ............................................. C02F 3/30
[52] U.S. Cl. ................................... 210/605; 210/614; 210/630; 210/631; 210/903; 210/906
[58] Field of Search ............... 210/614, 630, 631, 745, 210/903, 906, 908, 605

[56] References Cited

U.S. PATENT DOCUMENTS 4,159,243 6/1979 Okey .
4,173,531 11/1979 Matsch et al. .
4,333,838 6/1982 Ballnus .
4,353,800 10/1982 Besik .
4,437,992 3/1984 Saito et al. .
4,655,925 4/1987 Tabata et al. .
4,859,341 8/1989 Schreiber .

FOREIGN PATENT DOCUMENTS 0008471 3/1980 European Pat. Off. .
2306704 8/1974 Fed. Rep. of Germany .
3221287 12/1983 Fed. Rep. of Germany .
61-54296 3/1986 Japan .

Primary Examiner—Stanley S. Silverman
Assistant Examiner—Christopher Upton
Attorney, Agent, or Firm—Bell, Seltzer, Park & Gibson

[57] ABSTRACT

A method for biologically removing approximately seventy-five percent of the phosphate contaminants from wastewater comprises controlling the aerator to a single activated sludge tank according to the turbidity of the water and the effluent requirements. Oxic, anoxic, and anaerobic reactions occur sequentially over the entire volume of the single reactor. Greater phosphate removal requires a simultaneous chemical precipitation.

16 Claims, 1 Drawing Sheet

PROCESS FOR BIOLOGICAL WASTEWATER TREATMENT

This application is a continuation of application Ser. No. 07/179,701, filed on Apr. 11, 1988, now abandoned.

BACKGROUND OF THE INVENTION

1. Field of the Invention

This invention relates to a more efficient and less expensive process for biological wastewater treatment that uses the activated sludge process to remove contaminants, including phosphates.

2. Description of the Related Art

Previously, wastewater treatment plants commonly removed phosphates from contaminated wastewater by one of three methods: chemically, using a process known as coagulation or chemical precipitation; biologically, using the activated sludge process that requires tanks connected in series for each of the metabolic processes of bacteria; or by a combination of chemical precipitation and the activated sludge process. None of these methods as previously practiced is entirely satisfactory. Increasingly stringent standards for effluent water quality have created a steadily growing need for less costly, more efficient phosphate removal.

Chemical precipitation is expensive, requiring the addition to wastewater of costly chemical flocculating agents and disposal of the metal contaminated sludge. In chemical precipitation, the treatment plant adds flocculating agents such as iron or aluminum salts to the wastewater. These flocculating agents form an insoluble hydroxide floc, which is a feathery, highly absorbent substance that absorbs colloidal and suspended solids. The entire floc settles and the precipitated phosphate is removed as sludge. While extremely effective—a treatment plant can dispose of its purified water in surface waters—these costly chemical flocculants maintain plant operating costs at a high level, and disposing of large quantities of sludge contaminated with metals increases the expense.

The activated sludge process, while less expensive because it requires no chemical flocculating agents or disposal of metal contaminated sludge, nevertheless depends on a carefully controlled sequence of metabolic processes of bacteria that removes less phosphate than chemical precipitation. These distinct metabolic processes, the oxic or aerobic, the anoxic, and the anaerobic, have been confined to separate tanks. These separate tanks that are connected in series require corresponding recirculation and return systems for the mixed liquor, and separate aeration, monitoring, and control systems. An example is published in R. Böll, *Biological Nitrogen and Phosphorus Removal in Wastewater Treatment Plants*, 1987 Institute für Stadtbauwesen der Technischen Universität Braunschweig 42. All the papers in that issue disclose that the oxic, anoxic, and anaerobic reactions for biological removal of phosphorous must be carried out in separate reactors, tanks, or reactor portions connected in series and having corresponding mixed liquor recirculation and sludge return systems.

In the oxic tank, the bacteria use dissolved oxygen supplied through an aerator to oxidize and decompose organic substances. The energy released on oxidation provides for bacterial growth and absorption of orthophosphates from the water that the bacteria convert to polyphosphates. The bacteria accumulate these polyphosphates in the interior of the cell. Additionally, ammonium that is present oxidizes to form nitrates and nitrides, a form of chemically bound oxygen.

Next in sequence, the anoxic phase of the reaction takes place in a separate tank. No aerators supply dissolved oxygen to this tank, and no dissolved oxygen is present to decompose organic substances. Instead, by a process of microbiological respiration in the absence of dissolved oxygen, chemically bound oxygen is released from the nitrates and nitrides. The nitrates and nitrides are converted to nitrogen, and organic substances are oxidized.

In the next reaction in the sequence, the anaerobic phase, no aerators supply dissolved oxygen to the tank, and no oxygen should be present as a nitrate or nitride. Under these process conditions, the bacteria convert energy-rich polyphosphates from the interior of the cell into orthophosphates that dissolve in the water, releasing energy. Dissolved organic material of low molecular weight continuously enters the tank and is absorbed and accumulated by the bacteria.

Phosphates are removed from wastewater by this process because more orthophosphate is absorbed from the water and converted to polyphosphate in the oxic tank than is released in the anaerobic tank. Because the process is cyclic, the higher the orthophosphate released in the anaerobic reactor, the even greater absorption and conversion of orthophosphate in the oxic reactor. Consequently, increasing the amount of orthophosphate released in the anaerobic reactor increases the amount of phosphate removed from the water by the bacteria.

Achieving a high orthophosphate release in the anaerobic reactor requires that no oxygen be supplied so that no dissolved oxygen is available, and that no chemically bound oxygen be present in the form of nitrates or nitrides. The oxic phase depletes the dissolved oxygen, and the anoxic phase depletes chemically bound oxygen.

The following table presents the process conditions for the desired metabolism at each tank:

| Phase | Conditions | Metabolism |
|---|---|---|
| Oxic | Oxygen supply; dissolved oxygen present; Formation of nitrates and nitrides. | Oxidation of organic substances. Oxidation of ammonium to nitrates and nitrides. Increased absorption of orthophosphate from the water. Conversion of orthophosphate to cell polyphosphate. |
| Anoxic | No oxygen supply; no dissolved oxygen present; reduction of nitrates and nitrides. | Denitrification, i.e., reduction of nitrate to nitrogen. Oxidation of organic substances. |
| Anaerobic | No oxygen supply; no dissolved oxygen; no chemically bound oxygen (as a nitrate or nitride). | Conversion of cell polyphosphate into orthophosphate. Microbiological energy production. Release of orthophosphate in the water. Accumulation of organic substances. |

These systems having separate tanks have several disadvantages that increase their cost and reduce their efficiency:

1. Operating costs remain higher than necessary for systems using several tanks connected in series.

2. Higher pumping costs result, in most cases, from the larger hydraulic head required by cascaded tanks connected in series.

3. Complicated and expensive mixed liquor recirculation and sludge return systems must be supplied for individual reactors.

4. The several smaller tank volumes are designed for a constant incoming pollution load, and cannot be satisfactorily adjusted to a variety of incoming pollution loads. Organic pollutant load, hydraulic flow, and even our understanding of pollutants and their compositions change every hour, day, week, and season of the year.

5. Capital costs for monitoring and control equipment increase since each reactor requires separate adjustment for aeration and mixing.

A wastewater treatment system is desirable that can achieve purification of wastewater in only one tank for all of the oxic, anoxic, and anaerobic reactions. Such a system would be less complex and less costly than a cascaded series of tanks. A one tank system should require lower hydraulic head and consequently lower pumping costs. Complicated and expensive recirculation and sludge return systems could be eliminated for all but the one tank, thus reducing capital expenditures and maintenance costs. Furthermore, a large volume, single tank system could handle a wide variety of hydraulic flow and pollutant loads.

SUMMARY OF THE INVENTION

This invention comprises a continuous process for biological wastewater treatment using the activated sludge process. This invention accomplishes in a single tank carbon, nitrogen, and phosphate removal. The method carries out oxic, anoxic, and anaerobic reactions sequentially in a repetitive and regular cycle, providing the entire tank volume for each phase.

Wastewater introduced to an activated sludge tank contacts the activated sludge and undergoes in sequence a cycle comprising oxic, anoxic, and anaerobic reactions until the pollutants are biologically decomposed and removed. The treatment occurs in a single reaction vessel, each reaction occurring over the entire tank volume. No separate tank portion is provided for a particular reaction. For example, if denitrification in the anoxic reaction is not complete because of an insufficiency of substrate, then anaerobic phosphate release will not be optimized. However, when using a single reactor vessel the entire tank volume is available with a significantly longer retention time, and each incoming organic load serves to denitrify. The subsequent anaerobic phase starts only after complete denitrification.

The retention time for each reaction is based on the prevailing effluent requirements, and may be controlled depending on the turbidity, the biochemical oxygen demand ("BOD"), the chemical oxygen demand ("COD"), or any parameter of purity of the wastewater, including simply providing enough time for the reactions to run to completion. Mixed liquor suspended solids, which are continuously derived as a side-stream from the activated sludge reactor, are separated into activated sludge and clarified water fractions. The clarified water fraction is then submitted to turbidity, BOD, or COD measurement.

Accordingly, it is an object of this invention to provide a one-tank system for removing phosphates from wastewater biologically. It is also an object of this invention to combine the separate reactions of an activated sludge wastewater treatment system into a single vessel where the oxic, anoxic, and anaerobic reactions are carried out sequentially. A still further object of the invention is to eliminate duplicative, complicated, and expensive mixed liquor recirculation and sludge return systems to several individual reactors.

A more specific object of the instant invention is to provide a one-tank wastewater treatment system using activated sludge to remove phosphorous that controls aeration to the reactor inexpensively and easily by monitoring the turbidity of the wastewater.

DETAILED DESCRIPTION OF THE PREFERRED EMBODIMENT

Figure 1:
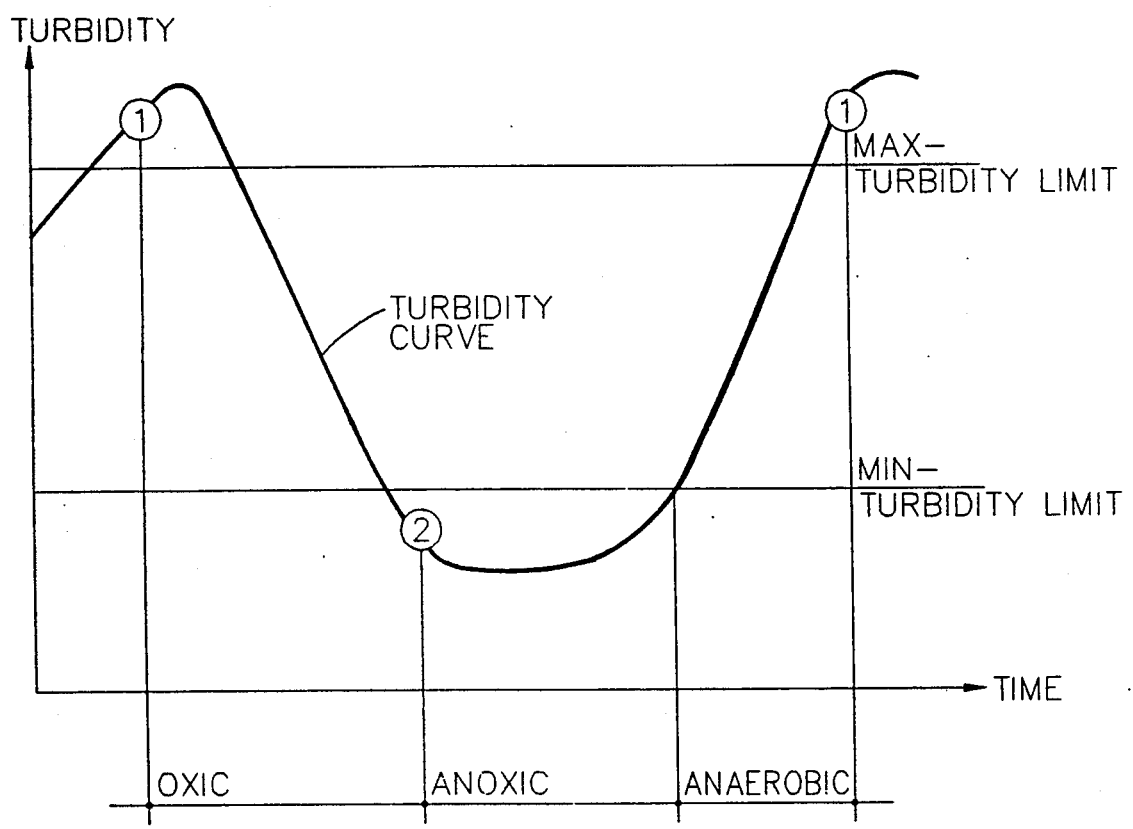
FIG. 1 shows a plot of turbidity against time, and the points of time and turbidity where the oxygen supply is either shut off or turned on according to the method of the invention.

Referring now to FIG. 1, blowers supplying oxygen to a sludge tank are switched on at point 1 when the measured turbidity value goes over a preset maximum turbidity limit. At this time, the oxic phase starts, during which removal of carbonaceous compounds, nitrification, and phosphate uptake by the bacteria occur in the presence of dissolved oxygen. The turbidity value gradually decreases during the oxic phase. As soon as the turbidity value goes below a preset minimum turbidity limit at point 2 (when a sufficient purification is obtained) the blowers are deactivated, cutting off the oxygen supply.

The anoxic phase begins, characterized by the absence of dissolved oxygen and by the presence of chemically bound oxygen in the form of nitrates or nitrides. With the continuing supply of organic carbonaceous material, the bacteria oxidize the organic substances with the oxygen from the nitrates and nitrides. Even with the blowers deactivated turbidity remains below the preset minimum turbidity limit. The turbidity starts to increase when the bacteria consume all oxygen from the nitrates and nitrides. The anoxic phase changes into the anaerobic phase.

The conversion of cell-polyphosphate into orthophosphate and its subsequent release in the water to provide energy for the bacteria occurs in the anaerobic phase in the absence of both dissolved oxygen and bound oxygen in the form of nitrates or nitrides. Turbidity in the activated sludge tank gradually increases by the continuing supply of organic substances. Blowers are activated again when the turbidity goes beyond the maximum turbidity limit at point 1. The oxic phase supercedes the anaerobic, and the cycle is repeated.

The prevailing effluent requirements control the duration of each phase according to the quality of water in the activated sludge tank. The oxygen supply initiates decomposition of organics, nitrification, and phosphate uptake, and restarts only after reaching a preselected maximum turbidity limit and a certain organic concentration.

Again, according to the prevailing effluent requirements, the oxygen supply stops when a preselected minimum turbidity value is reached, carbonaceous compounds are largely eliminated, ammonium is largely nitrified, and orthophosphate is largely removed from the water. The nitrate concentration and the need for denitrification is at its highest. Denitrification occurs in the following anoxic phase.

The anoxic phase lasts only so long as there is a demand, or, in other words, as long as nitrate is present. The anoxic phase then changes into the anaerobic phase.

In the anaerobic phase, in the absence of both dissolved and bound oxygen and under a simultaneous supply of organic substances, the bacteria release orthophosphate. This process is continued until the maximum turbidity limit is reached and, with the activation of blowers, changes into the oxic phase.

Turbidity can be used to control a blower in accordance with the prevailing requirements and to control the duration of the oxic, anoxic, and anaerobic phases. It is also possible to control aeration by using similar parameters such as the BOD or COD which, in this measuring range, are almost linearly dependent. In their application, however, they are significantly more expensive, complicated and time consuming than monitoring turbidity. Turbidity measurement provides a virtually instantaneous indication of the progress of the reaction through the separate phases. One could empirically determine the time necessary for each phase of the reaction, but any change of influent conditions alters the time of the reaction, and influent conditions constantly change. Turbidity measurement is therefore preferred.

A state of the art method and apparatus for aerating wastewater in an oxic phase is disclosed in U.S. Pat. No. 4,333,838 to Ballnus, the contents of which are incorporated herein by reference. This invention provides a monitoring device that measures visible depth, or turbidity, of the wastewater and starts-up or shuts-off ventilation accordingly.

Biological phosphate elimination in a single tank with simple control over aeration and control of the sequence of oxic, anoxic, and anaerobic reactions according to the prevailing effluent requirements accomplishes an overall efficiency that cannot be obtained with other biological wastewater treatment plants using more complicated systems. However, the nature of the biological process is one of equilibrium such that some phosphate will always be present in a clarified water effluent from an activated sludge bed. Phosphate release in the anaerobic phase results in small quantities of phosphate reaching the plant effluent, and an average of about 75% of the phosphate is all that one can reasonably expect to remove biologically.

Nevertheless, seventy-five percent phosphate removal means for many plants a significant improvement in advanced wastewater treatment. Where surface water protection requires higher phosphate removal, the more efficient method of the instant invention may be combined with a chemical precipitation treatment to remove remaining phosphates. A water treatment facility ideally precipitates chemically only that amount of phosphate that cannot be eliminated biologically in the least costly manner.

Chemical flocculants may be added to the effluent for the biological treatment plant, or they may be added directly to the activated sludge tank. Direct addition of flocculants to the activated sludge tank is known as simultaneous precipitation. For simultaneous phosphate precipitation the coagulants will preferably be added to the activated sludge tank via either the inlet or the sludge return from the final clarifier. The dosage can be given globally or in a controlled manner. The global dosage, which is used predominantly for smaller plants, is based on measured field data for biological phosphate removal and uses a constant quantity of coagulant in the wastewater of the plant to satisfy the calculated, globally remaining phosphate content.

The controlled coagulant dosage is preferred for larger plants. The phosphate content in the activated sludge tank is measured continuously or quasi-continuously. The quantity of coagulants to be added to the mixed liquor suspended solids is in accordance with the measured phosphate concentrations. It is advantageous to measure the phosphate concentration of the same clarified water fraction that was used for measuring turbidity.

Chemical phosphate precipitation, when provided as an adjunct to biological phosphate removal, provides an alternative that is less expensive than chemical precipitation alone and more effective than biological removal. Furthermore, the combination of the more efficient biological method of the instant invention with a supplemental simultaneous chemical precipitation eliminates in the least costly manner enough phosphate to satisfy stringent surface water conditions.

What is claimed is:

1. An activated sludge process for the biological treatment of wastewater to remove carbonaceous, nitrogenous, and phosphorus compounds from the wastewater, the process comprising the steps of:
    (a) introducing the wastewater into a treatment tank containing mixed liquor suspended solids;
    (b) monitoring the turbidity of the wastewater in said treatment tank;
    (c) establishing maximum and minimum limits from the turbidity;
    (d) comparing the turbidity to the limits established according to step (c);
    (e) supplying oxygen to the mixed liquor to initiate an oxic process phase when the turbidity passes the maximum limit;
    (f) repeating steps (b) through (d) and stopping the supply of oxygen to the mixed liquor and continuing to introduce wastewater into the mixed liquor suspended solids when the turbidity passes the minimum limit to discontinue the oxic process phase and to initiate an anoxic process phase;
    (g) continuing to introduce wastewater into the mixed liquor suspended solids in the absence of supplied oxygen to drive the anoxic process phase to completion and to initiate an anaerobic process phase;
    (h) repeating steps (b) through (d) and continuing to introduce wastewater into the mixture liquor suspended solids during the anaerobic process phase to case the turbidity to approach and pass its maximum limit;
    (i) repeating steps (b) through (g); and
    (j) continuously withdrawing mixed liquor from the treatment tank.

2. The process of claim 1 wherein the step of monitoring the turbidity comprises withdrawing a portion of the mixed liquor suspended solids from the treatment tank, separating the withdrawn portion to form a clarified water fraction, and measuring the turbidity.

3. The process of claim 1 wherein the step (d) of comparing the turbidity to the established limits is performed continuously.

4. The process of claim 1 including the additional step of introducing coagulant to the mixed liquor suspended solids in the treatment tank.

5. The process of claim 4 wherein the introduction of coagulant includes the steps of withdrawing mixed liquor suspended solids from the treatment tank, separating the mixed liquor suspended solids to obtain a sludge, adding coagulant to at least a portion of the sludge, and returning sludge having added coagulant to the treatment tank.

6. The process of claim 4 wherein the introduction of coagulant includes the steps of determining the amount of phosphorus that is biologically removed from the wastewater, determining the globally remaining phosphorus concentration of the wastewater, and maintaining a constant quantity of coagulant in the wastewater in dependence on the remaining phosphorus concentration.

7. The process of claim 4 wherein the introduction of coagulant includes the steps of:
   (a) withdrawing a portion of mixed liquor suspended solids from the treatment tank;
   (b) separating the withdrawn portion to form a clarified water fraction;
   (c) measuring the concentration of phosphorus in the clarified portion of the wastewater obtained in step (b); and
   (d) adding coagulant to the mixed liquor suspended solids in dependence on the measured phosphorus concentration.

8. The process of claim 7 wherein the phosphorus concentration of the wastewater is measured continuously.

9. An activated sludge process for the biological treatment of wastewater to remove carbonaceous, nitrogenous, and phosphorus compounds form the wastewater, the process comprising the steps of:
   (a) continuously introducing wastewater to be treated into a treatment tank containing mixed liquor suspended solids;
   (b) separating a portion of the mixed liquor suspended solids to obtain a clarified water fraction;
   (c) establishing maximum and minimum turbidity limits for the clarified water fraction;
   (d) monitoring the turbidity of the clarified water fraction obtained in accordance with step (b);
   (e) comparing the turbidity monitored in accordance with step (d) to the limits established in accordance with step (c);
   (f) supplying oxygen tot he mixed liquor in response to the monitored turbidity exceeding the maximum limit established in accordance with step (c) to initiate an oxic process phase;
   (g) repeating steps (6) through (e) and stopping the supply of oxygen to the mixed liquor in response to the monitored turbidity falling below the minimum limit established in accordance with step (c) to change the oxic phase into an anoxic phase that is followed by an anaerobic phase;
   (h) repeating step (b) through (g);
   (i) continuously withdrawing mixed liquor from the treatment tank;
   (j) introducing the mixed liquor withdrawn in accordance with step (i) into at least one clarifier;
   (k) separating the mixed liquor suspended solids to obtain a sludge and a treated wastewater effluent;
   (l) discharging treated wastewater effluent; and
   (m) returning at least a portion of the sludge to the treatment tank.

10. The process of claim 9 wherein the process includes the additional step of continuously withdrawing a portion of the mixed liquor suspended solids from the treatment tank for separation according to step (b).

11. The process of claim 9 wherein steps (b), (d), and (e) are performed continuously.

12. The process of claim 9 wherein the process includes the additional step of introducing coagulant to the mixed liquor suspended slides in the treatment tank.

13. The process of claim 12 wherein the introduction of coagulant includes the steps of withdrawing mixed liquor suspended solids from the treatment tank, separating the mixed liquor suspended solids to obtain a sludge, adding coagulant to at least a portion of the sludge, and returning sludge having added coagulant to the treatment tank.

14. The process of claim 12 wherein the introduction of coagulant includes the steps of determining the amount of phosphorus that is biologically removed from the wastewater, determining the globally remaining phosphorus concentration of the wastewater, and maintaining a constant quantity of coagulant in the wastewater in dependence on the remaining phosphorus concentration.

15. The process of claim 12 wherein the introduction of coagulant includes the steps of:
   (a) withdrawing a portion of mixed liquor suspended solids from the treatment tank;
   (b) separating the withdrawn portion to form a clarified water fraction;
   (c) measuring the concentration of phosphorus in the clarified portion of the wastewater obtained in step (b); and
   (d) adding coagulant to the mixed liquor suspended solids in dependence on the measured phosphorus concentration.

16. The process of claim 15 wherein the phosphorus concentration of the wastewater is measured continuously.

* * * * *

UNITED STATES PATENT AND TRADEMARK OFFICE
CERTIFICATE OF CORRECTION

PATENT NO. : 5,076,928
DATED : December 31, 1991
INVENTOR(S) : Wilhelm Ballnus It is certified that error appears in the above-identified patent and that said Letters Patent is hereby corrected as shown below:

```
Column 6, line 30, "from" should be -- for --.

Column 6, line 49, "mixture" should be -- mixed --.

Column 6, line 51, "case" should be -- cause --.

Column 7, line 45, "tot he" should be -- to the --.

Column 7, line 49, "(6)" should be -- (b) --.

Column 8, line 3, "step" should be -- steps --.

Column 8, line 21, "slides" should be -- solids --.
```

Signed and Sealed this

Fifteenth Day of June, 1993

Attest:

MICHAEL K. KIRK

Attesting Officer     Acting Commissioner of Patents and Trademarks